(12) United States Patent
Lee et al.

(10) Patent No.: US 9,436,479 B2
(45) Date of Patent: Sep. 6, 2016

(54) BOOTING A MOBILE ELECTRONIC DEVICE WITH A LOW BATTERY BASED ON A DYNAMIC BOOT THRESHOLD

(75) Inventors: Gordon P. Lee, San Diego, CA (US); Eric B. Zeisel, San Diego, CA (US); Jennifer A. Hagstrom, San Diego, CA (US); Cheong Kun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 13/291,940

(22) Filed: Nov. 8, 2011

(65) Prior Publication Data

US 2012/0185684 A1  Jul. 19, 2012

Related U.S. Application Data

(60) Provisional application No. 61/433,451, filed on Jan. 17, 2011.

(51) Int. Cl.
  *G06F 9/44* (2006.01)
  *G06F 1/26* (2006.01)
  *G06F 11/14* (2006.01)

(52) U.S. Cl.
  CPC ............. *G06F 9/4401* (2013.01); *G06F 1/263* (2013.01); *G06F 11/1417* (2013.01)

(58) Field of Classification Search
  CPC ....................................................... G06F 1/263
  USPC ...................................................... 713/340, 2
  See application file for complete search history.

(56) References Cited

U.S. PATENT DOCUMENTS

| 6,100,672 A | 8/2000 | Siponen |
| 6,144,569 A | 11/2000 | Rodriguez et al. |
| 6,157,172 A | 12/2000 | Niemitalo et al. |

(Continued)

FOREIGN PATENT DOCUMENTS

| CN | 100573417 C | 12/2009 |
| JP | H11110087 A | 4/1999 |

(Continued)

OTHER PUBLICATIONS

International Search Report and Written Opinion—PCT/US2012/021370—ISA/EPO—Jul. 5, 2012.

(Continued)

*Primary Examiner* — Robert Cassity
(74) *Attorney, Agent, or Firm* — Howard Seo

(57) ABSTRACT

A method, an apparatus, and a computer program product for booting the apparatus with a low-energy battery are provided. In a first configuration, the apparatus monitors a level of the battery while the battery is charging. The apparatus attempts a boot of the apparatus when the level is greater than or equal to a dynamic boot threshold. The apparatus increases the dynamic boot threshold when the boot is unsuccessful and repeating the monitoring and the attempting based on the increased dynamic boot threshold. In a second configuration, the apparatus detects a connection to an external power source. The apparatus attempts a boot using an FLCB protocol that is based upon power drawn directly from the external power source upon detecting the connection to the external power source. The apparatus attempts the boot as part of an ATC protocol when the boot using the FLCB protocol is unsuccessful.

54 Claims, 8 Drawing Sheets

(56) References Cited

U.S. PATENT DOCUMENTS

| | | |
|---|---|---|
| 6,946,817 B2 | 9/2005 | Fischer et al. |
| 7,541,776 B2 | 6/2009 | Tupman et al. |
| 2005/0110462 A1 | 5/2005 | Ullrich et al. |
| 2006/0015757 A1* | 1/2006 | Tupman et al. ............ 713/300 |
| 2006/0287007 A1 | 12/2006 | Veselic et al. |
| 2009/0150660 A1 | 6/2009 | Yao et al. |
| 2009/0267570 A1* | 10/2009 | Paunonen .................... 320/150 |
| 2010/0090644 A1* | 4/2010 | Nokkonen et al. .......... 320/107 |
| 2010/0205472 A1* | 8/2010 | Tupman et al. ............. 713/340 |
| 2010/0219797 A1 | 9/2010 | Veselic et al. |
| 2011/0022826 A1 | 1/2011 | More et al. |

FOREIGN PATENT DOCUMENTS

| | | |
|---|---|---|
| JP | 2007020398 A | 1/2007 |
| JP | 2008184988 A | 8/2008 |
| JP | 2009060716 A | 3/2009 |
| JP | 2010206948 A | 9/2010 |
| JP | 2010217962 A | 9/2010 |
| KR | 20080060040 A | 7/2008 |
| KR | 20100005055 A | 1/2010 |
| TW | I325533 B | 6/2010 |
| WO | 2004075371 A1 | 9/2004 |
| WO | 2008120044 | 10/2008 |

OTHER PUBLICATIONS

Partial International Search Report—PCT/US2012/021370—ISA/EPO—Apr. 10, 2012.

Taiwan Search Report—TW101101614—TIPO—Dec. 27, 2014.

* cited by examiner

BOOTING A MOBILE ELECTRONIC DEVICE WITH A LOW BATTERY BASED ON A DYNAMIC BOOT THRESHOLD

CROSS-REFERENCE TO RELATED APPLICATION(S)

This application claims the benefit of U.S. Provisional Application Ser. No. 61/433,451, entitled "BOOTING A MOBILE ELECTRONIC DEVICE WITH A LOW-BATTERY BASED ON A DYNAMIC BOOT THRESHOLD" and filed on Jan. 17, 2011, which is expressly incorporated by reference herein in its entirety.

BACKGROUND

1. Field

The present disclosure relates generally to communication systems, and more particularly, to booting a mobile electronic device with a low battery based on a dynamic boot threshold.

2. Background

Mobile electronic devices conventionally rely upon internal batteries as a primary power source. After a period of using a mobile electronic device, the voltage level of the internal battery falls below a shutdown threshold level and the mobile electronic device shuts down. To boot the mobile electronic device, the internal battery must be charged to a predetermined level before a boot is attempted. Waiting for the internal battery to be charged to the predetermined level before attempting to boot the mobile electronic device may cause the user to wait longer than necessary to use the mobile electronic device. As such a need exists for a method and apparatus for booting with shorter wait times when the battery is low.

SUMMARY

In an aspect of the disclosure, a method, an apparatus, and a computer program product for booting the apparatus with a low-energy battery are provided. The apparatus monitors a level of the battery while the battery is charging. In addition, the apparatus attempts a boot of the apparatus when the level is greater than or equal to a dynamic boot threshold. Furthermore, the apparatus increases the dynamic boot threshold when the boot is unsuccessful and repeating the monitoring and the attempting based on the increased dynamic boot threshold.

In an aspect of the disclosure, a method, an apparatus, and a computer program product for booting the apparatus with a low-energy battery are provided. The apparatus detects a connection to an external power source. In addition, the apparatus attempts a boot using an FLCB protocol that is based upon power drawn directly from the external power source upon detecting the connection to the external power source. Furthermore, the apparatus attempts the boot as part of an ATC protocol when the boot using the FLCB protocol is unsuccessful.

DETAILED DESCRIPTION

Figure 1:
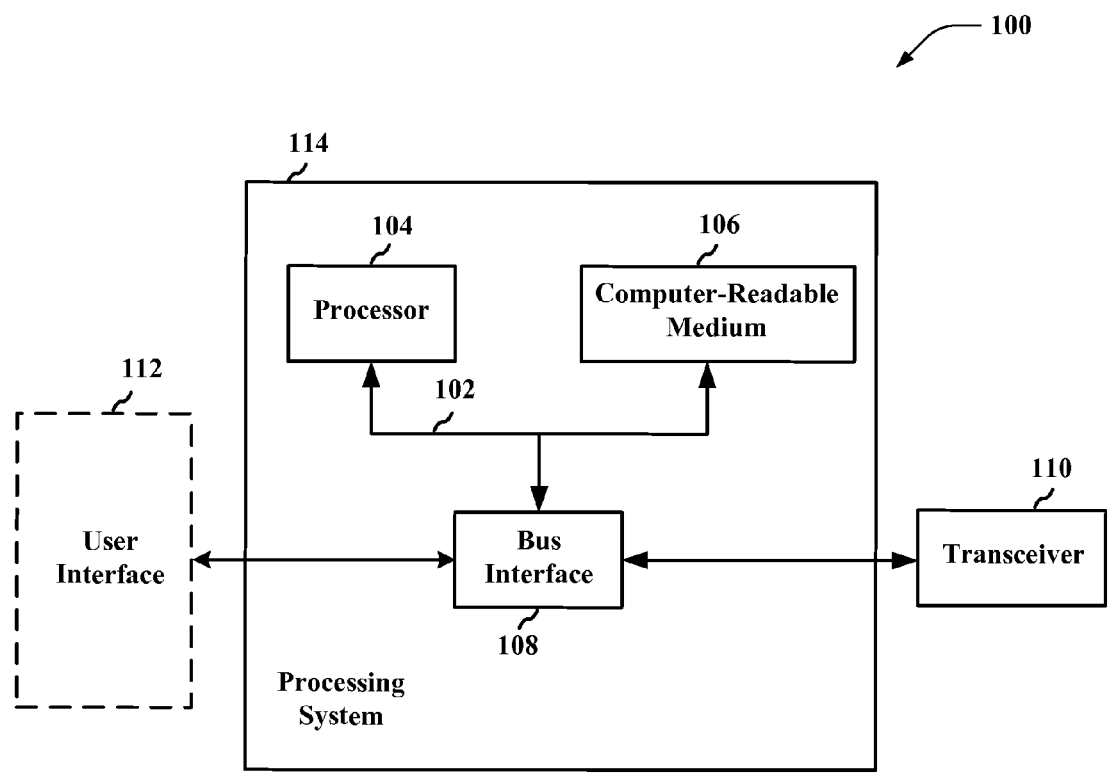
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
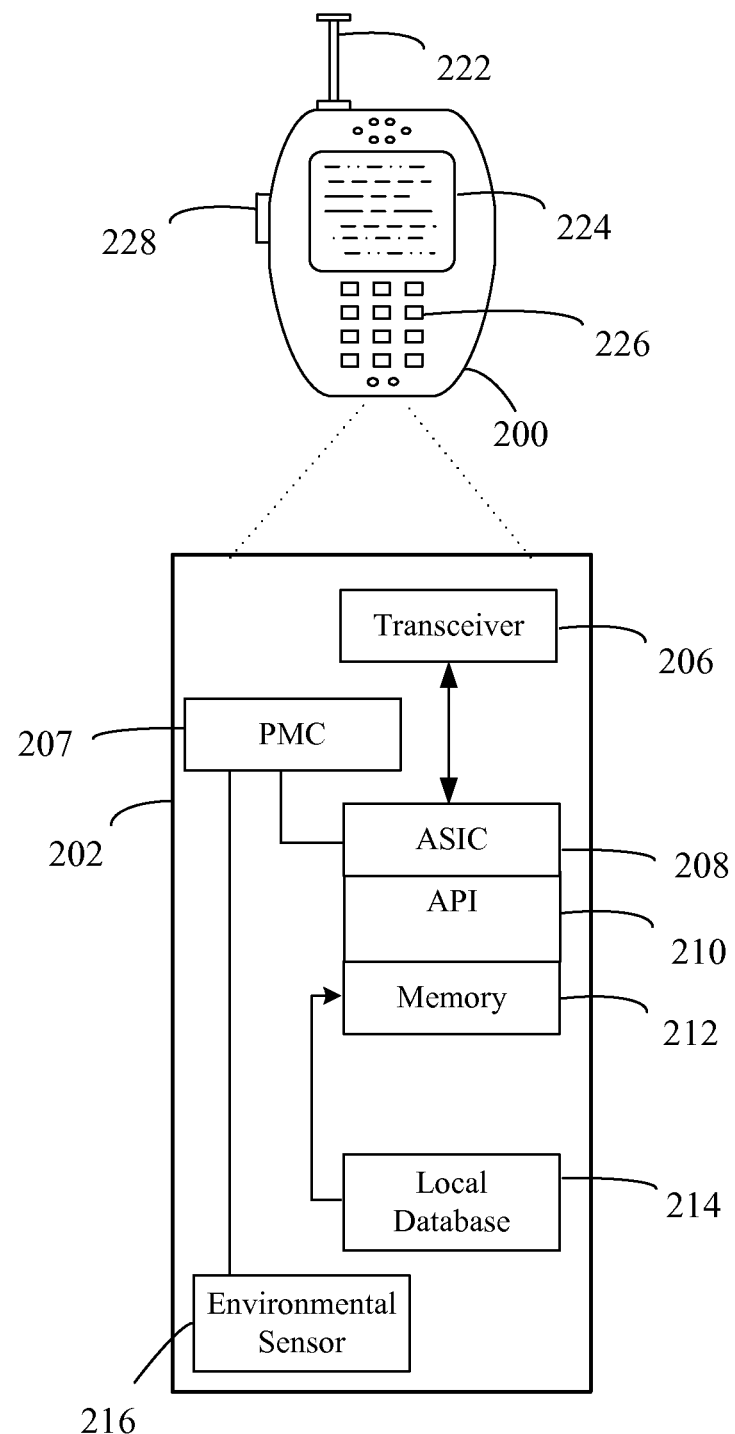
FIG. 2 is another diagram illustrating an exemplary apparatus.

FIG. 2 is another diagram illustrating an exemplary apparatus 200. The apparatus 100 may be a mobile electronic device (MED) 200. The MED 200 may alternatively be referred to by those skilled in the art as a user equipment (UE), a mobile station, a subscriber station, a mobile unit, a subscriber unit, a wireless unit, a wireless node, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. The user interface 112 may include a display 224, a push-to-talk button 228, and a keypad 226, among other components. The computer-readable medium may include a memory 212 and may additionally include a local database 214. The processor 104 may include a power management circuit (PMC) 207 and may additionally include an application specific integrated circuit (ASIC) 208.

The MED 200 has a platform 202 that can receive and execute software applications, data, and/or commands transmitted from an access network that may ultimately come from a core network, the Internet, and/or other remote servers and networks. The platform 202 may include a transceiver 206 operably coupled to the ASIC 208, or other processor, microprocessor, logic circuit, or other data processing device. The ASIC 208 or other processor executes the application programming interface (API) 210 layer that interfaces with any resident programs in the memory 212. The platform 202 also can include a local database 214 that can hold applications not actively used in memory 212. The local database 214 may be a flash memory cell, but alternatively may be any secondary storage device as known in the art, such as magnetic media, EEPROM, optical media, tape, soft or hard disk, or the like. The platform 202 components can also be operably coupled to external devices such as the antenna 222, the display 224, the push-to-talk button 228, and the keypad 226. The platform 202 may further include an environmental sensor 216 to which the PMC 207 is coupled. The PMC 207 may determine environmental conditions such as an environmental temperature. Based on environmental conditions, the battery type/identification, and the battery lifetime, the PMC 207 may control a boot procedure of a MED.

The various logic elements can be embodied in discrete elements, software modules executed on a processor or any combination of software and hardware to achieve the functionality disclosed herein. For example, the ASIC 208, the memory 212, the API 210, and the local database 214 may all be used cooperatively to load, to store, and to execute the various functions disclosed herein and thus the logic to perform these functions may be distributed over various elements. Alternatively, the functionality could be incorporated into one discrete component. Therefore, the features of the MED 200 in FIG. 2 are to be considered merely illustrative.

Figure 3:
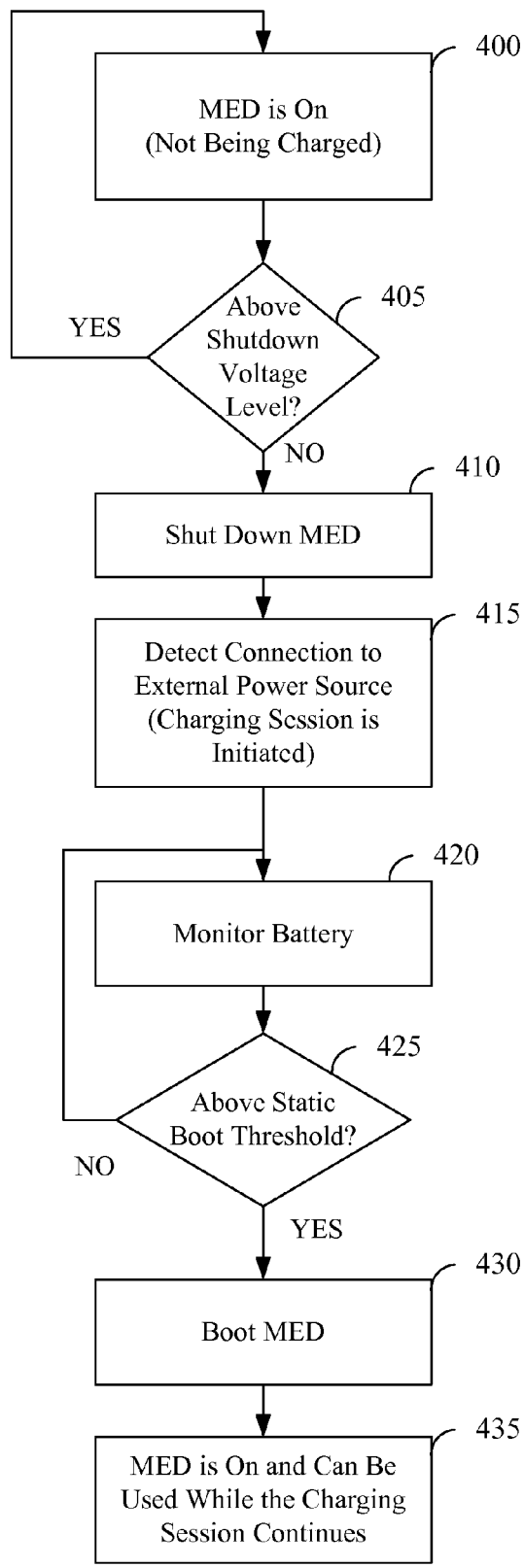
FIG. 3 illustrates a conventional boot procedure of a mobile electronic device.

FIG. 3 illustrates a boot procedure of a MED. Assume the MED is on and is not being charged (400). The MED includes a PMC that monitors the voltage level of the battery and determines whether the battery voltage level is less than or equal to a shutdown voltage level (405). When the battery level drops below a shutdown voltage level, the PMC facilitates a shutdown of the MED (410). After the MED shuts down, the MED will be inoperable until the battery is replaced or the MED is connected to an external power source. When the MED is connected to an external power source, the PMC detects the connection and begins charging the battery (415). The external power source may be through a power cord connected to a wall outlet, through a Universal Serial Bus (USB) connection through a computer or wall outlet, or through other means for providing power to the MED.

The boot procedure is implemented with an auto trickle charge (ATC) protocol, whereby all input power is dedicated to charging the battery of the MED until the battery's voltage level reaches a static boot threshold, after which the power used to boot the MED is drawn from the charging battery and/or from the external power source. The PMC monitors the battery voltage level (420), and when the battery voltage level is above the static boot threshold (425), boots the MED (430). The static boot threshold is greater than the shutdown voltage level, and is sufficiently high so that the boot of the MED (430) will occur at a high probability at that voltage level. The static boot threshold is set to a voltage level such that irrespective of the condition of the battery (e.g., battery lifetime, battery type) or environmental conditions (e.g., environmental temperature), a boot of the MED will occur at a high probability. Once booted, the MED is on and can be used while charging continues (435).

Figure 4:
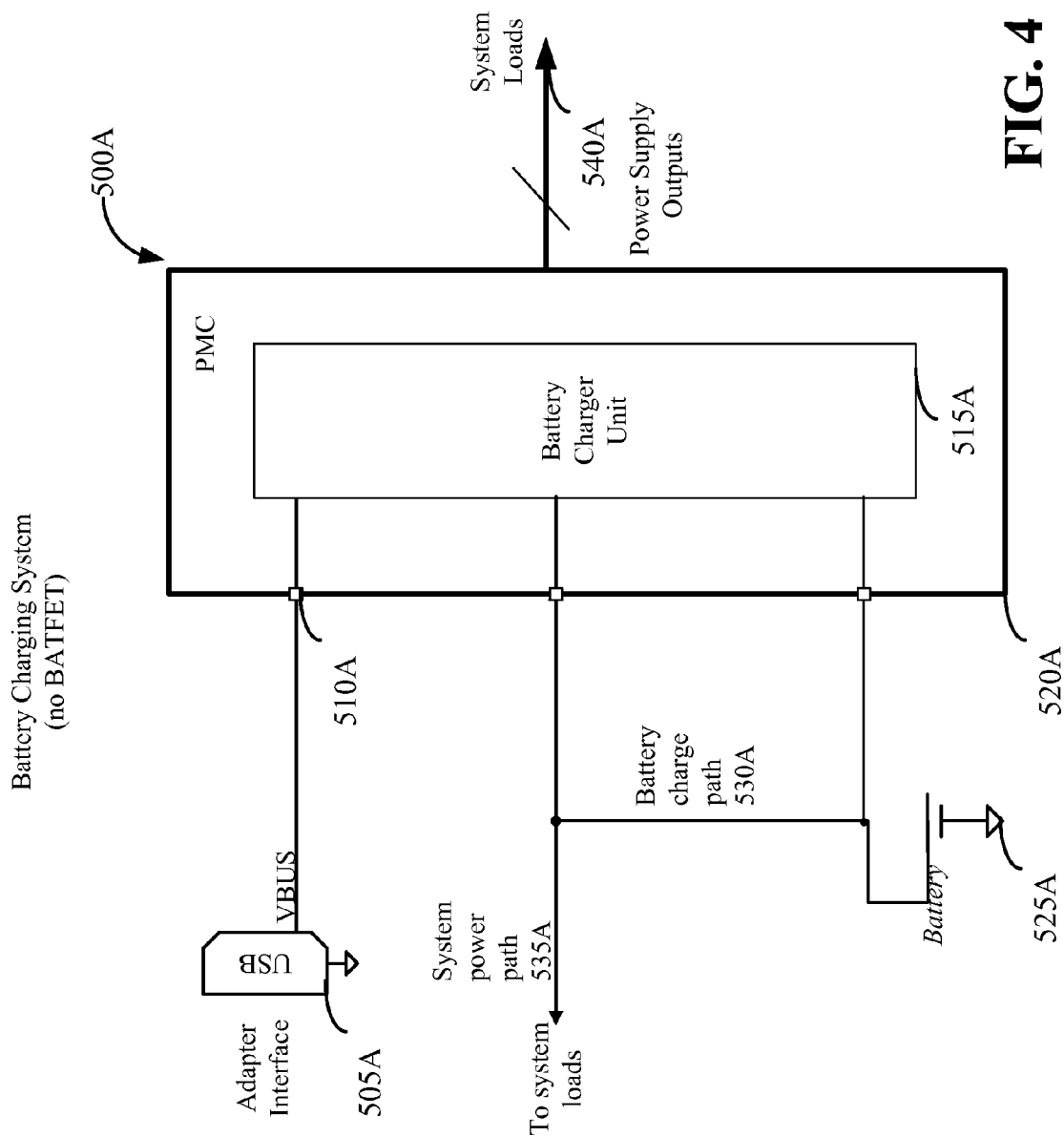
FIG. 4 illustrates a first exemplary battery charging system implemented within a mobile electronic device.

FIG. 4 illustrates a first exemplary battery charging system 500A implemented within a MED. The battery charging system 500A does not include a battery field effect transistor (BATFET) to isolate the battery 525A. As shown in FIG. 4, the battery charging system 500A includes an adapter interface 505A. The adapter interface 505A may correspond to a USB interface. However, a USB is merely one example implementation of the adapter interface 505A. A USB cord can be connected to an external power source (e.g., a USB wall-plug adapter, a USB port on a computer, etc.) and the USB cord can also be plugged into the adapter interface 505A in order to provide power to the MED. The adapter interface 505A is coupled to a voltage bus 510A that is also coupled to a battery charger unit 515A of a PMC 520A. The PMC 520A may correspond to a power management integrated controller (PMIC), a discrete charger, a comparator, a glue logic circuit, and/or any other equivalent circuit.

The battery charger unit 515A within the PMC 520A routes power from the adapter interface 505A to a battery 525A via a battery charge path 530A, and also routes power from the adapter interface 505A to system loads within the MED via a system power path 535A. The PMC 520A can forward power from the adapter interface 505A to power supply outputs 540A that connect to other system loads that do not draw power directly from the battery 525A.

Figure 5:
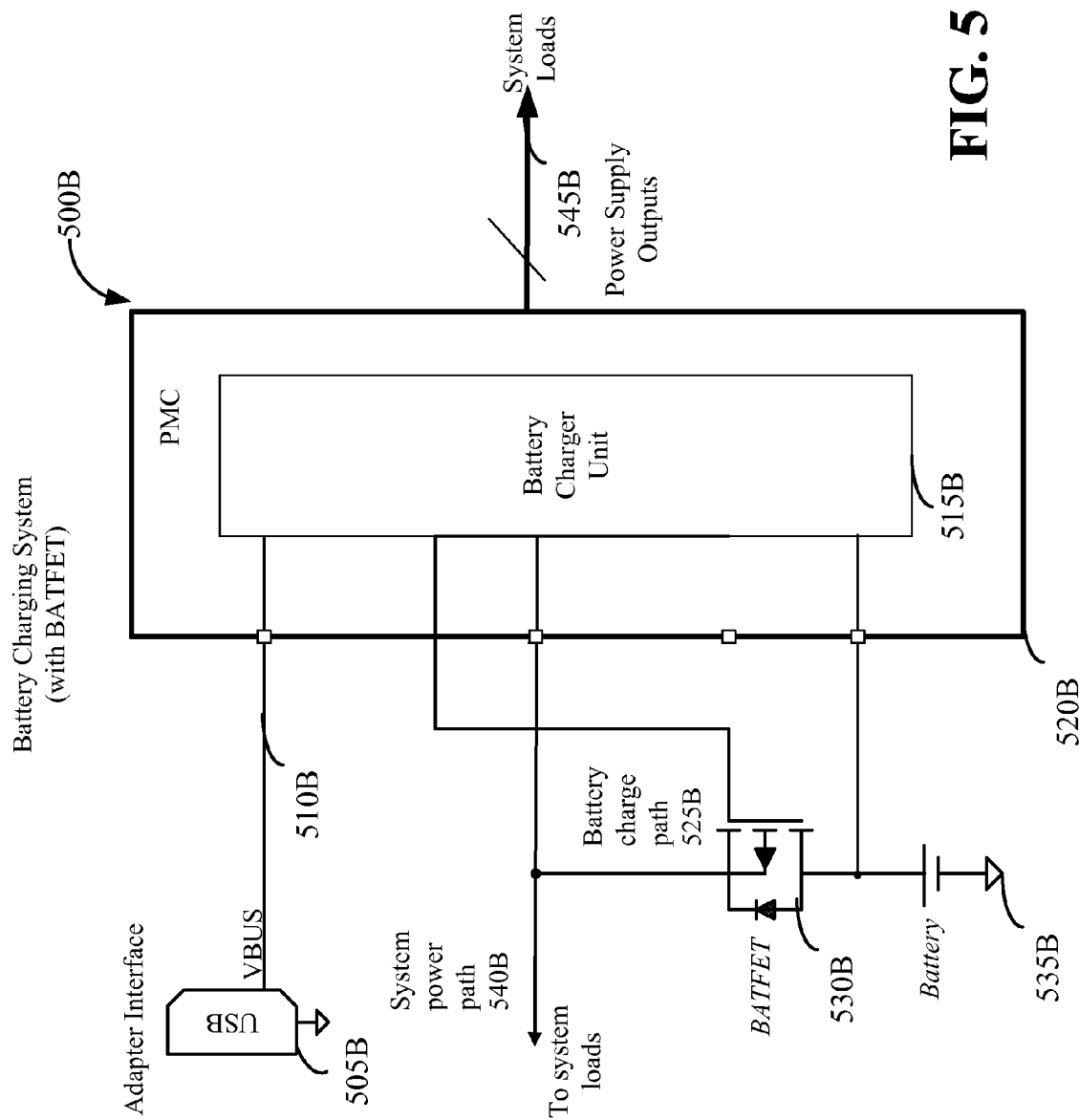
FIG. 5 illustrates a second exemplary battery charging system implemented within a mobile electronic device.

FIG. 5 illustrates a second exemplary battery charging system 500B implemented within a MED. The battery charging system 500B includes a BATFET to isolate the battery 535B. As shown in FIG. 5, the battery charging system 500B includes an adapter interface 505B. Similar to the adapter interface 505A of FIG. 4, the adapter interface 505B can correspond to a USB interface or port, although a USB is merely one example implementation of the adapter interface. The adapter interface 505B is coupled to a voltage bus 510B that is also coupled to a battery charger unit 515B of a PMC 520B. The PMC 520B may correspond to a PMIC, a discrete charger, a comparator, a glue logic circuit, and/or any other equivalent circuit.

The battery charger unit 515B within the PMC 520B routes power from the adapter interface 505B over a battery charging path 525B to a BATFET 530B, which in turn controls the voltage that is applied to a battery 535B for charging purposes. The battery charger unit 515B also routes power directly to system loads via a system power path 540B. The PMC 520B can also forward power from the adapter interface 505B to power supply outputs 545B that connect to other system loads that do not draw power directly from the battery 535B.

The implementation of the BATFET 530B within the battery charging system 500B permits executing of a fast-low current boot (FLCB) protocol, whereby the input voltage obtained by the adapter interface 505B is leveraged for booting the MED, instead of relying upon the battery voltage output from the battery 535B. During an FLCB-based boot, all power or substantially all power from the adapter interface 505B may be dedicated to the boot procedure, as the battery 535B may be isolated for charging by the BATFET 530B.

The FLCB-based boot implemented with the BATFET 530B, if successful, permits faster boots for MEDs with dead batteries as compared to waiting for the battery voltage to rise to a given voltage level. However, BATFETs are not provisioned in all MEDs, and therefore the FLCB-based boot may not necessarily be available. Also, booting a MED using FLCB can be restricted based on a current or amperage requirement associated with booting the MED. For example, consumption from a USB standard downstream port is typically limited to 100 milliamps until a slave device is successful in securing additional current through enumeration and negotiation with a host device. In this case, 100 milliamps may be insufficient to boot the MED. Thus, the presence of a BATFET does not guarantee successful booting of the MED via the FLCB protocol.

Figure 6:
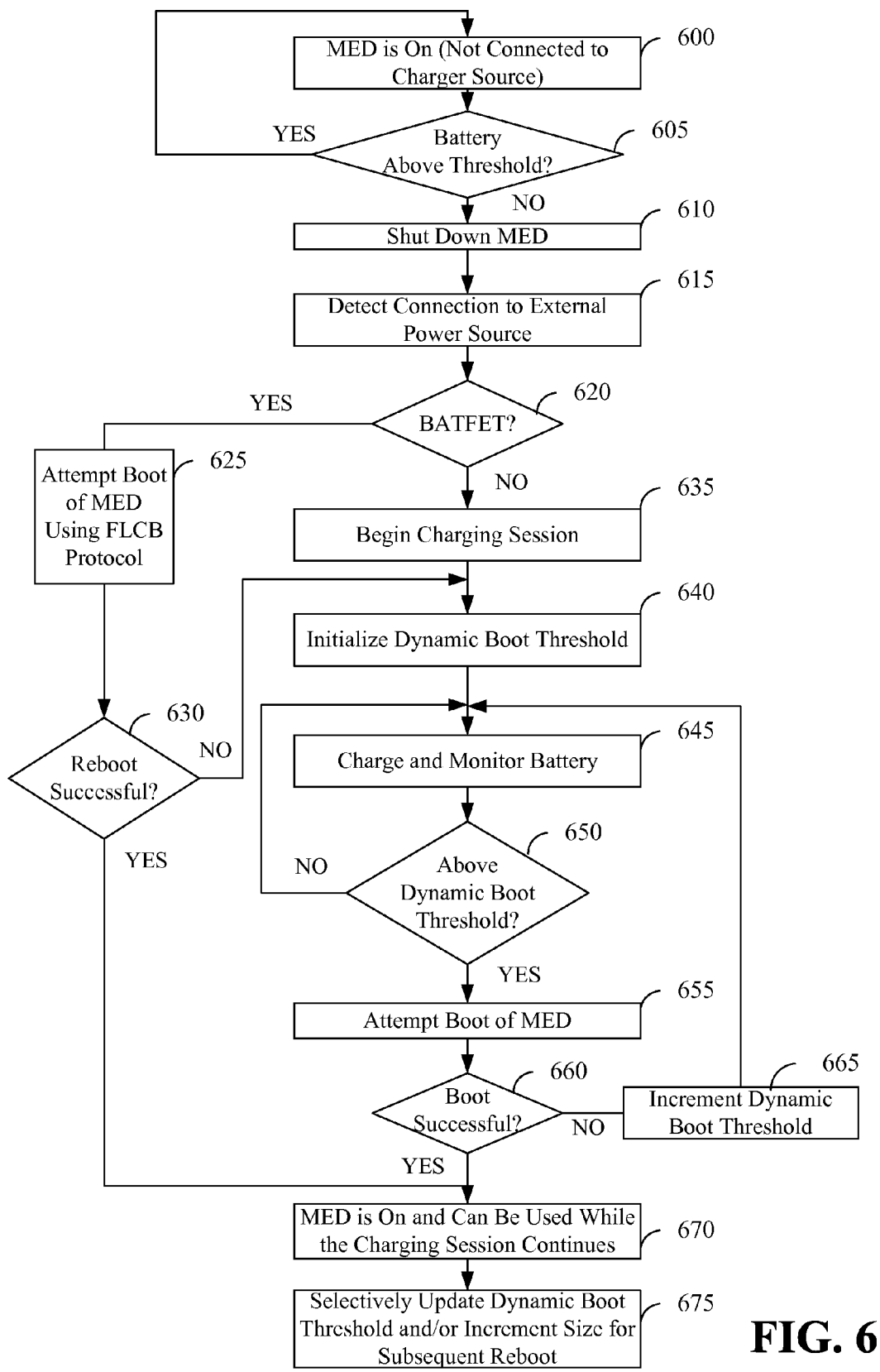
FIG. 6 illustrates a first exemplary boot procedure of a mobile electronic device with a low battery.

FIG. 6 illustrates a first exemplary boot procedure of a MED with a low battery. The process of FIG. 6 can be implemented in a MED that does not include a BATFET and is not eligible for a boot procedure in accordance with the FLCB protocol (e.g., as in FIG. 4) and/or in a MED that includes a BATFET and is eligible for an FLCB-based boot procedure (e.g., as in FIG. 5). Referring to FIG. 6, assume that a MED is on (e.g., powered-up and being operated by a user) and that the MED is not currently being charged (600). Accordingly, the MED is draining its battery in 600. The MED includes a PMC (e.g., the PMC 520A of FIG. 4 and/or the PMC 520B of FIG. 5) that monitors the voltage level of the battery to determine when the voltage level drops below a shutdown voltage threshold (605). The shutdown voltage threshold (e.g., 2.6 V or 2.7 V) can be established to avoid drawing too deeply on the battery, which can degrade future performance of the battery, or can be established so that the MED has sufficient time to save information before shutting down.

If the PMC determines that the voltage level of the battery remains above the shutdown voltage threshold in 605, the process returns to 600 and the user can continue to operate the MED. Otherwise, if the PMC determines that the voltage level of the battery is no longer above the shutdown voltage threshold in 605, the PMC facilitates a shutdown of the MED (610). After the MED is shutdown due to the low-battery condition, the user will not be able to operate the MED again until the user replaces the battery or connects the MED to an external power source to charge the existing battery. At some later point in time, assume that the user plugs the MED into an external power source. Accordingly, the PMC detects that the MED is connected to the external power source (615).

After detecting the connection to the external power source, the PMC determines whether a BATFET is available for implementing an FLCB-based boot of the MED (620). If the PMC determines the BATFET to be available, the PMC isolates (i.e., does not charge) the battery of the MED via the BATFET, and the PMC attempts to boot the MED via the FLCB protocol (625). The PMC then determines whether the boot attempt is successful (630). If the boot attempt of the MED is successful, the process advances to 670 whereby the MED can again be operated by the user while the battery begins to charge.

If the PMC determines that no BATFET is available for an FLCB-based boot or the PMC determines the attempted FLCB-based boot is unsuccessful in 630 (e.g., due to insufficient current from the external power source), the PMC initiates a charging session and begins to charge the battery (635). Thus, an unsuccessful FLCB-based boot attempt can be determined and used to trigger a recovery procedure based on an ATC protocol. After beginning the charging session, the PMC initializes a dynamic boot threshold (640). The dynamic boot threshold may be initialized to a relatively aggressive (or low) level as compared to the static boot threshold. For example, the dynamic boot threshold may be initialized to a voltage (e.g., 2.8 V) such that a boot of the MED is not guaranteed. The dynamic boot threshold can correspond to a voltage threshold, a capacity threshold, a delivered charge threshold, a time threshold, a threshold related to any other performance metric that can be used to infer a battery's readiness to be used in a boot attempt of the MED, and/or any combination of a plurality of thresholds.

As discussed supra with respect to FIG. 3, the static boot threshold is set to a relatively conservative setting in order to guarantee that, after waiting for the battery to charge to the static boot threshold, most boots of the MED will be successful irrespective of the condition of the battery or environmental conditions. By contrast, the dynamic boot threshold in FIG. 6 may be established aggressively such that boot attempts of some MEDs may fail (at least at first) while other MEDs may achieve a successful boot at an earlier point in time as compared to FIG. 3. Thus, as an example, the dynamic boot threshold may be initialized in 640 to a level at which a new, modern battery may be expected to successfully boot the MED in an ideal operating environment (e.g., warm temperature). In one configuration, the dynamic boot threshold may be based in part upon current environmental conditions. For example, if the MED is currently in an especially cold environment (e.g., determined by the PMC based on sensor data reported from the environmental sensors 216), the dynamic boot threshold may be initialized to a somewhat higher or less aggressive value as compared to when the MED is in a warmer environment.

After loading the initial value of the dynamic boot threshold (640), the PMC continues charging the battery and begins to monitor the battery during the charging session (645). If the dynamic boot threshold is a voltage threshold, the PMC monitors the voltage level of the battery in 645. If the dynamic boot threshold is a capacity threshold, the PMC monitors a capacity of the battery (e.g., based upon Coulomb counting) in 645. If the dynamic boot threshold is a delivered charge threshold, the PMC monitors a charge being delivered by the battery (e.g., based upon Coulomb counting) in 645. If the dynamic boot threshold is a time threshold, the PMC monitors the amount of time that the battery has been charging (e.g., using a timer or counter include within and/or coupled to the PMC) in 645. The PMC compares the monitored level of the battery during the charging session with the dynamic boot threshold (650).

When the PMC determines that the monitored level of the battery is greater than or equal to the dynamic boot threshold in 650, the PMC facilitates a boot attempt of the MED (655). If the PMC determines that the boot attempt of the MED is not successful in 660, the PMC increases the dynamic boot threshold (665). The PMC may increase the dynamic boot threshold (665) by incrementing the dynamic boot threshold. For example, the PMC may increment the dynamic boot threshold by 100 mV, from 2.8 V to 2.9 V, or may increment the dynamic boot threshold by 1 minute from 2 minutes to 3 minutes. In one configuration, the increment of 665 may set the dynamic boot threshold to a level corresponding to the static boot threshold from 425 of FIG. 3 in order to guarantee success on a second boot attempt of the MED. In another configuration, the increment of 665 can set the dynamic boot threshold to an intermediate level between the initial level (from 640) and the static boot threshold from 425 of FIG. 3. For example, the increment I of 665 may be equal to the difference between the static boot threshold $T_s$ from 425 and the initial dynamic boot threshold $T_{di}$ from 640 divided by N, for integer N: $I=(T_s-T_{di})/N$. Setting the increment to I, increments the initial dynamic boot threshold from 640 to the static boot threshold from 425 after N increments. In a worst-case scenario, multiple boot attempts of the MED (e.g., N) may be attempted based on different values of the dynamic boot threshold before a successful boot.

In one configuration, the magnitude of the increments between boot-attempt iterations during the process of FIG. 6 can be the same or different between increment boot attempt cycles and/or from one execution of FIG. 6 to another execution of FIG. 6. For example, in "normal" environment conditions, the magnitude of each increment at 665 may correspond to a default level. Alternatively, the magnitude of each increment at 665 can be variable or dynamic. For example, if the PMC determines that the MED is in a relatively cold environment, the size of the increments at 665 may be increased so that the battery is granted more time to charge before another boot attempt is made.

Upon incrementing the dynamic boot threshold in 665, the process returns to 645 whereby the PMC continues to charge and to monitor the battery in 645 until the monitored level is determined to be greater than or equal to the incremented dynamic boot threshold in 650. After one or more iterations of the procedure shown between 645 and 665, the PMC determines that the MED has booted successfully and the MED can again be operated by the user while the battery continues to charge (670).

The PMC can optionally update the initialization level of the dynamic boot threshold and/or an increment magnitude for a subsequent boot attempt of the MED from a dead-battery or low-battery condition (675). For example, the initialization level of the dynamic boot threshold (i.e., the starting point or initial voltage level of the iterative boot procedure of FIG. 6 that is loaded at 640) can be set to the level at which a successful boot of the MED was actually achieved in a previous boot procedure. In another example, if a high number of boot attempts were made before a successful boot was achieved during the procedure of FIG. 6, the increment magnitude at 665 may be increased so that the MED is allocated more charging time between each boot attempt during a subsequent boot procedure.

Alternatively, the initialization level of the dynamic boot threshold and/or increment magnitude need not be updated. For example, historical boot performance may not always be a good indicator of future boot performance for a MED with a low battery or a dead battery. If a user replaces an old, poorly-performing battery on the MED with a newer battery, future boots may occur more quickly. Also, if the user moves from a poor-performance climate to a high-performance climate, future boots may occur more quickly. Thus, depending on the implementation, the initialization level of the dynamic boot threshold and/or increment magnitude can either be updated based on historical performance or can remain unchanged. Furthermore, at 675, the PMC may determine to decrease the initialization level of the dynamic boot threshold due to more favorable conditions, such as a new battery with a shorter battery lifetime, new battery of a different battery type, a more favorable environmental temperature, and/or one or more successful first boot attempts at 655.

Figure 7:
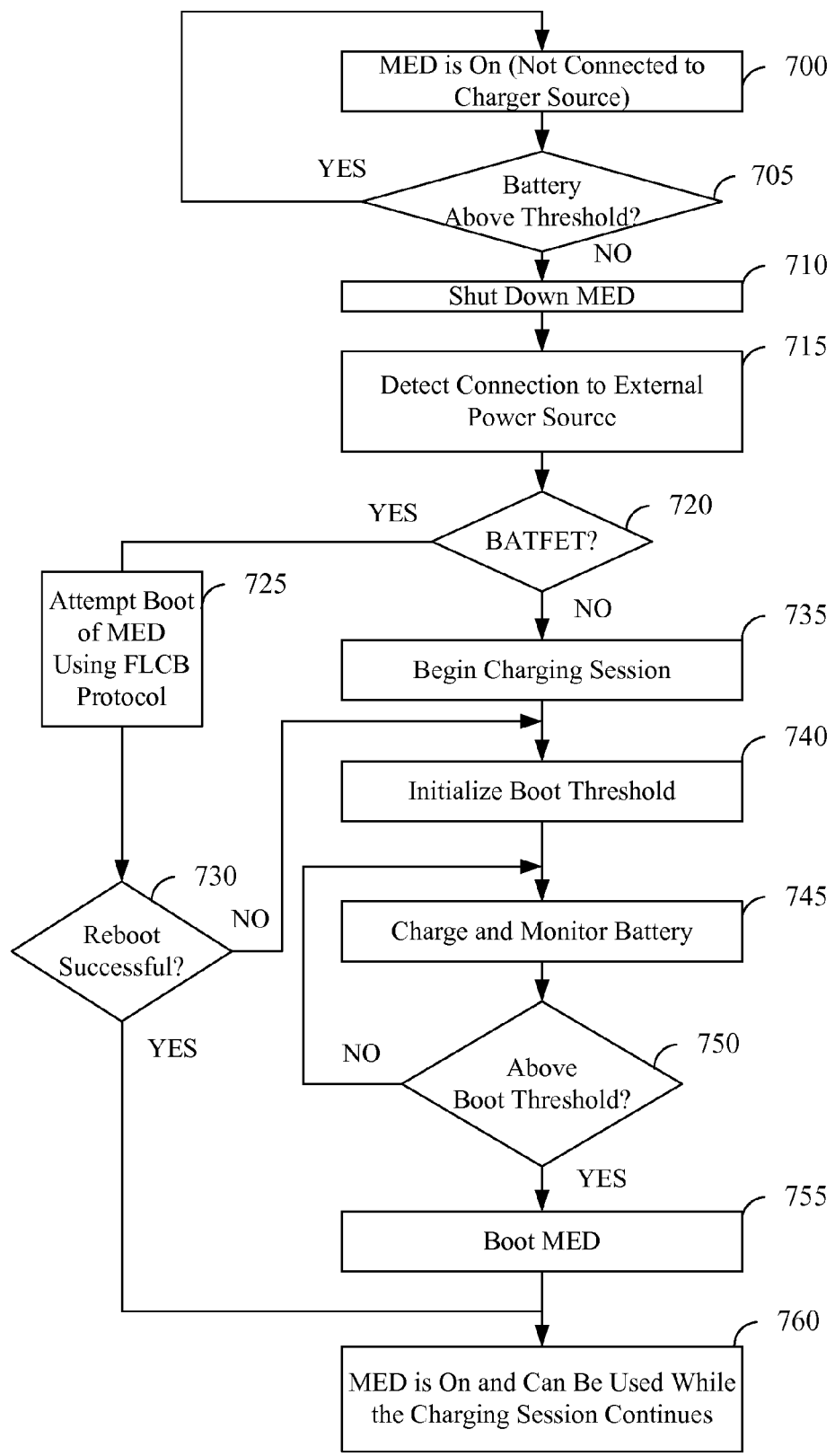
FIG. 7 illustrates a second exemplary boot procedure of a mobile electronic device with a low battery.

FIG. 7 illustrates a second exemplary boot procedure of a MED with a low battery. Referring to FIG. 7, assume that a MED is on (e.g., powered-up and being operated by a user) and that the MED is not currently being charged (700). Accordingly, the MED is draining its battery in 700. The MED includes a PMC (e.g., the PMC 520A of FIG. 4 and/or the PMC 520B of FIG. 5) that monitors the voltage level of the battery to determine when the voltage level drops below a shutdown voltage threshold (705). The shutdown voltage threshold (e.g., 2.6 V or 2.7 V) can be established to avoid drawing too deeply on the battery, which can degrade future performance of the battery, or can be established so that the MED has sufficient time to save information before shutting down.

If the PMC determines that the voltage level of the battery remains above the shutdown voltage threshold in 705, the process returns to 700 and the user can continue to operate the MED. Otherwise, if the PMC determines that the voltage level of the battery is no longer above the shutdown voltage threshold in 705, the PMC facilitates a shutdown of the MED (710). After the MED is shutdown due to the low-battery condition, the user will not be able to operate the MED again until the user replaces the battery or connects the MED to an external power source to charge the existing battery. At some later point in time, assume that the user plugs the MED into an external power source. Accordingly, the PMC detects that the MED is connected to the external power source (715).

After detecting the connection to the external power source, the PMC determines whether a BATFET is available for implementing an FLCB-based boot of the MED (720). If the PMC determines the BATFET to be available, the PMC isolates (i.e., does not charge) the battery of the MED via the BATFET, and the PMC attempts to boot the MED via the FLCB protocol (725). The PMC then determines whether the boot attempt is successful (730). If the boot attempt of the MED is successful, the process advances to 760 whereby the MED can again be operated by the user while the battery begins to charge.

If the PMC determines that no BATFET is available for an FLCB-based boot or the PMC determines the attempted FLCB-based boot is unsuccessful in 730 (e.g., due to insufficient current from the external power source), the PMC initiates a charging session and begins to charge the battery (735). Thus, an unsuccessful FLCB-based boot attempt can be determined and used to trigger a recovery procedure based on an ATC protocol. After beginning the charging session, the PMC initializes a boot threshold (740). The boot threshold may be initialized to a relatively conservative voltage level as compared to dynamic boot threshold at 640 of FIG. 6. The PMC loads the boot threshold with a relatively conservative setting in an attempt to achieve a high likelihood of boot success on the first boot attempt in 740. In one configuration, the boot threshold may be set to the static boot threshold of 425 of FIG. 3. The setting of the boot threshold may be based on the environmental conditions, as the PMC may load a relatively conservative setting when the environmental conditions are less favorable, and a less conservative setting when the environmental conditions are more favorable, while still guaranteeing a high likelihood of boot success on the first boot attempt in 740. After loading the initial value of the boot threshold (740), the PMC continues charging the battery and begins to monitor the battery during the charging session (745). Similar to the dynamic boot threshold, the boot threshold of FIG. 7 may be a voltage threshold, capacity threshold, delivered charge threshold, a time threshold, a threshold related to any other performance metric that can be used to infer a battery's readiness to be used in a boot attempt of the MED, and/or any combination of a plurality of thresholds. The PMC compares the monitored threshold of the battery during the charging session with the dynamic boot threshold (750). When the PMC determines that the monitored threshold of the battery is greater than or equal to the boot threshold in 750, the PMC facilitates a boot attempt of the MED (755). After the successful boot, the MED is on and can be used while the battery is charged (760).

Figure 8:
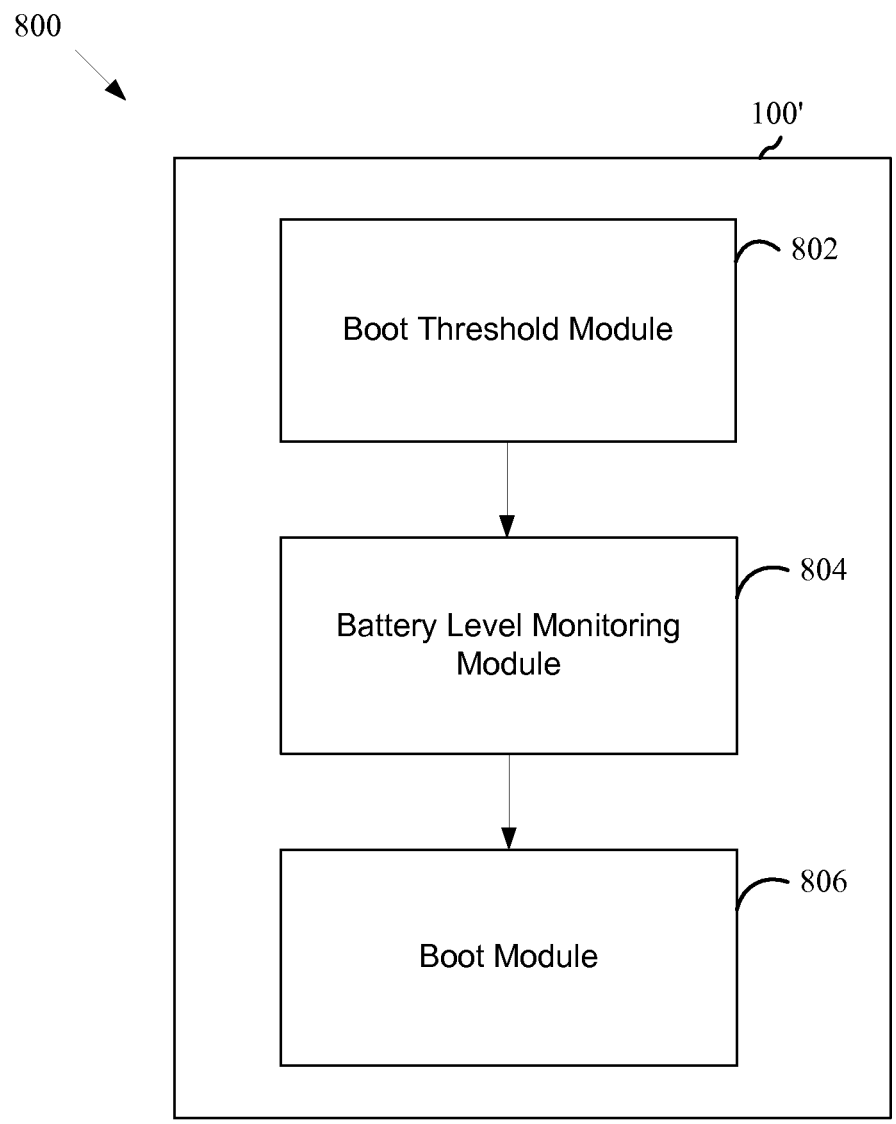
FIG. 8 is a conceptual block diagram illustrating the functionality of an exemplary apparatus.

FIG. 8 is a conceptual block diagram 800 illustrating the functionality of an exemplary apparatus 100', which may be a MED. In a first configuration (see also FIG. 6), the apparatus 100' includes a battery level monitoring module 804 that is configured to monitor a level of the battery while the battery is charging. The apparatus 100' further includes a boot module 806 that is configured to attempt a boot of the MED when the level is greater than or equal to a dynamic boot threshold. The apparatus 100' further includes a boot threshold module 802 that is configured to increase the dynamic boot threshold when the boot is unsuccessful. When the boot is unsuccessful, the battery level monitoring module 804 is configured to continue monitoring the level of the battery and the boot module 806 is configured to attempt a subsequent boot based on the increased dynamic boot threshold.

The monitored level may include at least one of a voltage level, a capacity level, a delivered charge level, or a time duration in which the battery is charged. The dynamic boot threshold may include at least one of a voltage threshold, a capacity threshold, a delivered charge threshold, or a time threshold. The boot threshold module 802 may be configured to initialize the dynamic boot threshold based on at least one of a lowest dynamic boot threshold in which the boot can be successful, a previous dynamic boot threshold at which the boot was successful, a battery lifetime, a battery type, or environmental conditions. The boot threshold module 802 may initialize the dynamic boot threshold by adjusting the previous dynamic boot threshold based on at least one of the battery lifetime, the battery type, or the environmental conditions. The boot threshold module 802 may initialize the dynamic boot threshold by setting the dynamic boot threshold to a level such that the attempted boot is successful under favorable conditions and potentially unsuccessful under unfavorable conditions.

The boot module 806 may be configured to detect a connection to an external power source and, upon detecting the connection to the external power source, to attempt the boot using an FLCB protocol that is based upon power drawn directly from the external power source. When the attempted boot using the FLCB protocol is unsuccessful, the battery level monitoring module 804, the boot module 806, and the boot threshold module 802 may be configured to perform the monitoring, boot attempt, and boot threshold increasing steps, respectively. The battery level monitoring module 804 and the boot module 806 may be implemented as part of an ATC protocol. The boot threshold module 802 may be configured to increase the dynamic boot threshold by incrementing the dynamic boot threshold by an increment value. The boot threshold module 802 may adjust the increment value based on at least one of a battery lifetime, a battery type, or environmental conditions.

The battery level monitoring module 804 may be configured to monitor a voltage level of the battery while the battery is not charging. The boot module 806 may be configured to shut down the MED when the voltage level is less than or equal to a shutdown voltage level. The level may be a voltage level of the battery, the dynamic boot threshold may be a dynamic boot voltage threshold, and the dynamic boot voltage threshold may be greater than the shutdown voltage level.

In a second configuration (see also FIG. 7), the apparatus 100' includes a boot module 806 that is configured to detect a connection to an external power source and to attempt a boot using an FLCB protocol that is based upon power drawn directly from the external power source upon detecting the connection to the external power source. The apparatus 100' further includes a boot threshold module 802 and a battery level monitoring module 804 that together with the boot module 806 are configured to attempt the boot as part of an ATC protocol when the boot using the FLCB protocol is unsuccessful.

The battery level monitoring module 804 may be configured to monitor a level of the battery while the battery is charging. The boot module 806 may be configured to attempt the boot of the MED when the level is greater than or equal to a boot threshold. The monitored level may include at least one of a voltage level, a capacity level, a delivered charge level, or a time duration in which the battery is charged. The boot threshold may include at least one of a voltage threshold, a capacity threshold, a delivered charge threshold, or a time threshold. The boot threshold module 802 may be configured to initialize the boot threshold based on a threshold in which the boot will be successful with a high probability. The boot threshold module 802 may be configured to initialize the boot threshold further based on at least one of a battery lifetime, a battery type, or environmental conditions.

The battery level monitoring module 804 may be configured to monitor a voltage level of the battery while the battery is not charging. The boot module 806 may be configured to shut down the MED when the voltage level is less than or equal to a shutdown voltage level. The level may be a voltage level of the battery, the boot threshold may be a boot voltage threshold, and the boot voltage threshold may be greater than the shutdown voltage level.

The apparatus 100' may include additional modules that perform each of the steps in the aforementioned flow charts. As such, each step in the aforementioned flow charts may be performed by a module and the apparatus 100' may include one or more of those modules.

While the first and second exemplary boot procedures are described with respect to a MED with a single battery, the exemplary boot procedures are applicable to a MED with two or more batteries. In a first configuration, the apparatus 100/100' for booting with a low-energy battery includes means for monitoring a level of the battery while the battery is charging, means for attempting a boot of the apparatus when the level is greater than or equal to a dynamic boot threshold, and means for increasing the dynamic boot threshold when the boot is unsuccessful and repeating the monitoring and the attempting based on the increased dynamic boot threshold. The apparatus may further include means for initializing the dynamic boot threshold based on at least one of a lowest dynamic boot threshold in which the boot can be successful, a previous dynamic boot threshold at which the boot was successful, a battery lifetime, a battery type, or environmental conditions. The apparatus may further include means for detecting a connection to an external power source, means for attempting the boot using an FLCB protocol that is based upon power drawn directly from the external power source upon detecting the connection to the external power source, and means for performing the monitoring, the attempting, and the increasing steps when the attempted boot using the FLCB protocol is unsuccessful. The apparatus may further include means for adjusting the increment value based on at least one of a battery lifetime, a battery type, or environmental conditions. The apparatus may further include means for monitoring a voltage level of the battery while the battery is not charging, and means for shutting down the apparatus when the voltage level is less than or equal to a shutdown voltage level. The aforementioned means may be one or more of the aforementioned modules of the apparatus 100' (see FIG. 8), the processing system 114 (see FIG. 1), and/or the PMC 207 (see FIG. 2) configured to perform the functions recited by the aforementioned means in conjunction with the boot procedure of FIG. 6.

In a second configuration, the apparatus 100/100' for booting with a low-energy battery includes means for detecting a connection to an external power source, means for attempting a boot using an FLCB protocol that is based upon power drawn directly from the external power source upon detecting the connection to the external power source, and means for attempting the boot as part of an ATC protocol when the boot using the FLCB protocol is unsuccessful. The apparatus may further include means for monitoring a level of the battery while the battery is charging, and means for attempting the boot of the apparatus when the level is greater than or equal to a boot threshold. The apparatus may further include means for initializing the boot threshold based on a threshold in which the boot will be successful with a high probability. The apparatus may further include means for monitoring a voltage level of the battery while the battery is not charging, and means for shutting down the apparatus when the voltage level is less than or equal to a shutdown voltage level. The aforementioned means may be one or more of the aforementioned modules of the apparatus 100' (see FIG. 8), the processing system 114 (see FIG. 1), and/or the PMC 207 (see FIG. 2) configured to perform the functions recited by the aforementioned means in conjunction with the boot procedure of FIG. 7.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of booting a mobile electronic device (MED) with a low-energy battery, comprising:

monitoring a level of the low-energy battery while the low-energy battery is charging;

determining a dynamic boot threshold battery value based, at least in part, on one or more detected environmental conditions, wherein the dynamic boot threshold battery value comprises at least one of a voltage level, a capacity level, a delivered charge level, or any combination thereof;

attempting a boot of the MED at least partially in response to determining that the level is greater than or equal to the dynamic boot threshold battery value;

increasing the dynamic boot threshold battery value by a first increment value at least partially in response to determining that the boot is unsuccessful and repeating the monitoring and the attempting based on the increased dynamic boot threshold battery value; and increasing the dynamic boot threshold battery value by at least a second increment value after unsuccessfully attempting the boot subsequent to increasing the dynamic boot threshold battery value by the first increment value, and repeating the monitoring and the attempting based on the increased dynamic boot threshold battery value, wherein a magnitude of the at least a second increment value is less than a magnitude of the first increment value.

2. The method of claim 1, wherein the monitored level comprises the voltage level, the capacity level, the delivered charge level, or any combination thereof.

3. The method of claim 1, further comprising initializing the dynamic boot threshold battery value based on at least one of: a lowest dynamic boot threshold battery value in which the boot can be successful, a previous dynamic boot threshold battery value at which the boot was successful, a battery lifetime, a battery type, or any combination thereof.

4. The method of claim 3, wherein the initializing the dynamic boot threshold battery value comprises adjusting the previous dynamic boot threshold battery value based on the battery lifetime, the battery type, the one or more detected environmental conditions, or any combination thereof.

5. The method of claim 3, wherein the initializing sets the dynamic boot threshold battery value to a level such that the attempted boot is successful under favorable conditions and potentially unsuccessful under unfavorable conditions.

6. The method of claim 1, further comprising:
detecting a connection to an external power source;
attempting the boot using a fast-low current boot (FLCB) protocol that is based upon power drawn directly from the external power source upon detecting the connection to the external power source; and
performing the monitoring, the attempting, and the increasing at least partially in response to the attempted boot using the FLCB protocol being unsuccessful.

7. The method of claim 1, wherein the monitoring and the attempting are implemented as part of a battery charge protocol.

8. The method of claim 1, further comprising adjusting the increment value based on a battery lifetime, a battery type, environmental conditions, or any combination thereof.

9. The method of claim 1, further comprising:
monitoring a voltage level of the low-energy battery while the low-energy battery is not charging; and
shutting down the MED in response to the voltage level being less than or equal to a shutdown voltage level.

10. The method of claim 9, wherein said level is a voltage level of the low-energy battery, the dynamic boot threshold battery value is a dynamic boot voltage threshold battery value, and the dynamic boot voltage threshold battery value is greater than the shutdown voltage level.

11. The method of claim 1, wherein the one of more detected environmental conditions comprise at least a detected temperature.

12. A method of booting a mobile electronic device (MED) with a low-energy battery, comprising:
detecting a connection to an external power source;
attempting a boot using a fast-low current boot (FLCB) protocol that is based upon power drawn directly from the external power source at least partially in response to detecting the connection to the external power source;

attempting the boot as part of a battery charge protocol at least partially in response to the boot using the FLCB protocol being unsuccessful;

determining a dynamic boot threshold battery value based, at least in part, on one or more detected environmental conditions, wherein the dynamic boot threshold battery value comprises at least one of a voltage level, a capacity level, a delivered charge level, or any combination thereof;

increasing the dynamic boot threshold battery value by a first increment value at least partially in response to the boot as part of a battery charge protocol being unsuccessful, and attempting another boot as part of the battery charge protocol based, at least in part, on the increased dynamic boot threshold battery value; and increasing the dynamic boot threshold value by at least a second increment value after unsuccessfully attempting the boot subsequent to increasing the dynamic boot threshold battery value by the first increment value, and repeating the monitoring and the attempting based on the increased dynamic boot threshold battery value, wherein a magnitude of the at least a second increment value is less than a magnitude of the first increment value.

13. The method of claim 12, further comprising:
monitoring a level of the low-energy battery while the low-energy battery is charging;
attempting the boot of the MED in response to the level being greater than or equal to a boot threshold.

14. The method of claim 13, wherein the monitored level comprises the voltage level, the capacity level, the delivered charge level, or any combination thereof.

15. The method of claim 13, further comprising initializing the boot threshold based on a threshold in which the boot will be successful with a high probability.

16. The method of claim 15, wherein the boot threshold is initialized further based on at least one of: a battery lifetime or a battery type.

17. The method of claim 13, further comprising:
monitoring a voltage level of the low-energy battery while the low-energy battery is not charging; and
shutting down the MED in response to the voltage level being less than or equal to a shutdown voltage level.

18. The method of claim 17, wherein said level is a voltage level of the low-energy battery, the boot threshold is a boot voltage threshold, and the boot voltage threshold is greater than the shutdown voltage level.

19. An apparatus for booting with a low-energy battery, comprising:
means for monitoring a level of the low-energy battery while the low-energy battery is charging;
means for determining a dynamic boot threshold battery value based, at least in part, on one or more detected environmental conditions, wherein the dynamic boot threshold battery value comprises a voltage level, a capacity level, a delivered charge level, or any combination thereof;
means for attempting a boot of the apparatus at least partially in response to determining that the level is greater than or equal to the dynamic boot threshold battery value;
means for increasing the dynamic boot threshold battery value by a first increment value at least partially in response to determining that the boot is unsuccessful and repeating the monitoring and the attempting based on the increased dynamic boot threshold battery value; and means for increasing the dynamic boot threshold battery value by at least a second increment value after unsuccessfully attempting the boot subsequent to increasing the dynamic boot threshold battery value by the first increment value, and repeating the monitoring and the attempting based on the increased dynamic boot threshold battery value, wherein a magnitude of the at least a second increment value is less than a magnitude of the first increment value.

20. The apparatus of claim 19, wherein the monitored level comprises the voltage level, the capacity level, the delivered charge level, or any combination thereof.

21. The apparatus of claim 19, further comprising means for initializing the dynamic boot threshold battery value based on a lowest dynamic boot threshold battery value in which the boot can be successful, a previous dynamic boot threshold battery value at which the boot was successful, a battery lifetime, a battery type, or any combination thereof.

22. The apparatus of claim 21, wherein the means for initializing the dynamic boot threshold battery value adjusts the previous dynamic boot threshold battery value based on the battery lifetime, the battery type, the one or more detected environmental conditions, or any combination thereof.

23. The apparatus of claim 21, wherein the means for initializing sets the dynamic boot threshold battery value to a level such that the attempted boot is successful under favorable conditions and potentially unsuccessful under unfavorable conditions.

24. The apparatus of claim 19, further comprising:
means for detecting a connection to an external power source;
means for attempting the boot using an external protocol that is based upon power drawn directly from the external power source upon detecting the connection to the external power source; and
means for performing the monitoring, the attempting, and the increasing at least partially in response to the attempted boot using the FLCB protocol being unsuccessful.

25. The apparatus of claim 19, wherein the means for monitoring and the means for attempting are implemented as part of a battery charge protocol.

26. The apparatus of claim 19, further comprising means for adjusting the increment value based on a battery lifetime, a battery type, environmental conditions, or any combination thereof.

27. The apparatus of claim 19, further comprising:
means for monitoring a voltage level of the low-energy battery while the low-energy battery is not charging; and
means for shutting down the apparatus in response to the voltage level being less than or equal to a shutdown voltage level.

28. The apparatus of claim 27, wherein said level is a voltage level of the low-energy battery, the dynamic boot threshold battery value is a dynamic boot voltage threshold, and the dynamic boot voltage threshold is greater than the shutdown voltage level.

29. An apparatus for booting with a low-energy battery, comprising:
means for detecting a connection to an external power source;
means for attempting a boot using a fast-low current boot (FLCB) protocol that is based upon power drawn directly from the external power source at least partially in response to detecting the connection to the external power source;
means for attempting the boot as part of a battery charge protocol at least partially in response to the boot using the FLCB protocol being unsuccessful;
means for determining a dynamic boot threshold battery value based, at least in part, on one or more detected environmental conditions, wherein the dynamic boot threshold battery value comprises a voltage level, a capacity level, a delivered charge level, or any combination thereof;
means for increasing the dynamic boot threshold battery value by a first increment value at least partially in response to the boot as part of a battery charge protocol being unsuccessful, and attempting another boot as part of the battery charge protocol based, at least in part, on the increased dynamic boot threshold battery value; and
means for increasing the dynamic boot threshold battery value by at least a second increment value after unsuccessfully attempting the boot subsequent to increasing the dynamic boot threshold battery value by the first increment value, and another boot as part of the battery charge protocol based, at least in part, on the increased dynamic boot threshold battery value, wherein a magnitude of the at least a second increment value is less than a magnitude of the first increment value.

30. The apparatus of claim 29, further comprising:
means for monitoring a level of the low-energy battery while the low-energy battery is charging;
means for attempting the boot of the apparatus in response to the level being greater than or equal to a boot threshold battery value.

31. The apparatus of claim 30, wherein the monitored level comprises the voltage level, the capacity level, the delivered charge level, or any combination thereof.

32. The apparatus of claim 30, further comprising means for initializing the boot threshold based on a threshold in which the boot will be successful with a high probability.

33. The apparatus of claim 32, wherein the boot threshold is initialized further based on a battery lifetime, a battery type, or a combination thereof.

34. The apparatus of claim 30, further comprising:
means for monitoring a voltage level of the low-energy battery while the low-energy battery is not charging; and
means for shutting down the apparatus in response to the voltage level being less than or equal to a shutdown voltage level.

35. The apparatus of claim 34, wherein said level is a voltage level of the low-energy battery, the boot threshold is a boot voltage threshold, and the boot voltage threshold is greater than the shutdown voltage level.

36. An apparatus for booting with a low-energy battery, comprising:
a processing system configured to:
monitor a level of the low-energy battery while the low-energy battery is charging;
determine a dynamic boot threshold battery value based, at least in part, on one or more detected environmental conditions, wherein the dynamic boot threshold battery value comprises a voltage level, a capacity level, a delivered charge level, or any combination thereof;

attempt a boot of the apparatus at least partially in response to determining that the level is greater than or equal to the dynamic boot threshold battery value; and increase the dynamic boot threshold battery value by a first increment value at least partially in response to determining that the boot is unsuccessful and repeating the monitoring and the attempting based on the increased dynamic boot threshold battery value; and increase the dynamic boot threshold battery value by at least a second increment value after unsuccessfully attempting the boot subsequent to the increasing the dynamic boot threshold battery value by the first increment value, and repeating the monitoring and the attempting based on the increased dynamic boot threshold battery value, wherein a magnitude of the at least a second increment value is less than a magnitude of the first increment value.

37. The apparatus of claim 36, wherein the monitored level comprises the voltage level, the capacity level, the delivered charge level, or any combination thereof.

38. The apparatus of claim 36, wherein the processing system is further configured to initialize the dynamic boot threshold battery value based on a lowest dynamic boot threshold battery value in which the boot can be successful, a previous dynamic boot threshold battery value at which the boot was successful, a battery lifetime, a battery type, or any combination thereof.

39. The apparatus of claim 38, wherein to initialize the dynamic boot threshold battery value, the processing system is configured to adjust the previous dynamic boot threshold battery value based on the battery lifetime, the battery type, the one or more detected environmental conditions, or any combination thereof.

40. The apparatus of claim 38, wherein processing system is configured to initialize the dynamic boot threshold battery value by setting the dynamic boot threshold battery value to a level such that the attempted boot is successful under favorable conditions and potentially unsuccessful under unfavorable conditions.

41. The apparatus of claim 36, wherein the processing system is further configured to:
detect a connection to an external power source;
attempt the boot using a fast-low current boot (FLCB) protocol that is based upon power drawn directly from the external power source at least partially in response to detecting the connection to the external power source;
perform the monitoring, the attempting, and the increasing at least partially in response to the attempted boot using the FLCB protocol being unsuccessful.

42. The apparatus of claim 36, wherein the processing system is configured to monitor and to attempt as part of a battery charge protocol.

43. The apparatus of claim 36, wherein the processing system is further configured to adjust the increment value based on a battery lifetime, a battery type, environmental conditions, or any combination thereof.

44. The apparatus of claim 36, wherein the processing system is further configured to:
monitor a voltage level of the low-energy battery while the low-energy battery is not charging; and
shutdown the apparatus in response to the voltage level being less than or equal to a shutdown voltage level.

45. The apparatus of claim 44, wherein said level is a voltage level of the low-energy battery, the dynamic boot threshold battery value is a dynamic boot voltage threshold battery value, and the dynamic boot voltage threshold battery value is greater than the shutdown voltage level.

46. An apparatus for booting with a low-energy battery, comprising:
a processing system configured to:
detect a connection to an external power source;
attempt a boot using a fast-low current boot (FLCB) protocol that is based upon power drawn directly from the external power source upon detecting the connection to the external power source;
attempt the boot as part of a battery charge protocol in response to the boot use of the FLCB protocol being unsuccessful;
determine a dynamic boot threshold battery value based, at least in part, on one or more detected environmental conditions, wherein the dynamic boot threshold battery value comprises a voltage level, a capacity level, a delivered charge level, or any combination thereof;
increase the dynamic boot threshold battery value by a first increment value if the boot as part of a battery charge protocol is successful and attempt another boot as part of the battery charge protocol based, at least in part, on the increased dynamic boot threshold battery value; and
increase the dynamic boot threshold battery value by at least a second increment value after unsuccessfully attempting the boot subsequent to increasing the dynamic boot threshold battery value by the first increment value, and attempt another boot as part of the battery charge protocol based, at least in part, on the increased dynamic boot threshold battery value, wherein a magnitude of the at least a second increment value is less than a magnitude of the first increment value.

47. The apparatus of claim 46, wherein the processing system is further configured to:
monitor a level of the low-energy battery while the low-energy battery is charging; attempt the boot of the apparatus in response to the level being greater than or equal to a boot threshold.

48. The apparatus of claim 47, wherein the monitored level comprises the voltage level, the capacity level, the delivered charge level, or any combination thereof.

49. The apparatus of claim 47, wherein the processing system is further configured to initialize the boot threshold battery value based on a threshold in which the boot will be successful with a high probability.

50. The apparatus of claim 49, wherein the dynamic boot threshold battery value is initialized further based on a battery lifetime, a battery type, or a combination thereof.

51. The apparatus of claim 47, wherein the processing system is further configured to:
monitor a voltage level of the low-energy battery while the low-energy battery is not charging; and
shutdown the apparatus in response to the voltage level being less than or equal to a shutdown voltage level.

52. The apparatus of claim 51, wherein said level is a voltage level of the low-energy battery, the dynamic boot threshold battery value is a boot voltage threshold, and the boot voltage threshold is greater than the shutdown voltage level.

53. A computer program product for booting a mobile electronic device (MED) with a low-energy battery, comprising:
a non-transitory computer-readable medium comprising code for:

monitoring a level of the low-energy battery while the low-energy battery is charging;

determining a dynamic boot threshold battery value based, at least in part, on one or more detected environmental conditions, wherein the dynamic boot threshold battery value comprises a voltage level, a capacity level, a delivered charge level, or any combination thereof;

attempting a boot of the MED at least partially in response to determining that the level is greater than or equal to the dynamic boot threshold battery value; and increasing the dynamic boot threshold battery value by a first increment value at least partially in response to determining that the boot is unsuccessful and repeating the monitoring and the attempting based on the increased dynamic boot threshold battery value; and increasing the dynamic boot threshold battery value by at least a second increment value after unsuccessfully attempting the boot subsequent to increasing the dynamic boot threshold battery value by the first increment value, and repeating the monitoring and the attempting based on the increased dynamic boot threshold battery value, wherein a magnitude of the at least a second increment value is less than a magnitude of the first increment value.

54. A computer program product for booting a mobile electronic device (MED) with a low-energy battery, comprising:

a non-transitory computer-readable medium comprising code for: detecting a connection to an external power source;

attempting a boot using a fast-low current boot (FLCB) protocol that is based upon power drawn directly from the external power source at least partially in response to detecting the connection to the external power source;

attempting the boot as part of a battery charge protocol at least partially in response to the boot using the FLCB protocol being unsuccessful;

determining a dynamic boot threshold battery value based, at least in part, on one or more detected environmental conditions, wherein the dynamic boot threshold battery value comprises a voltage level, a capacity level, a delivered charge level, or any combination thereof;

increasing the dynamic boot threshold battery value by a first increment value at least partially in response to the boot as part of a battery charge protocol being unsuccessful and attempting another boot as part of the battery charge protocol based, at least in part, on the increased dynamic boot threshold battery value; and increasing the dynamic boot threshold battery value by at least a second increment value after unsuccessfully attempting the boot subsequent to increasing the dynamic boot threshold battery value by the first increment value, and repeating the monitoring and the attempting based on the increased dynamic boot threshold battery value, wherein a magnitude of the at least a second increment value is less than a magnitude of the first increment value.

* * * * *